W. H. JENKINS.
Steam-Traps.

No. 155,521. Patented Sept. 29, 1874.

WITNESSES:
G. Matthys
A. W. Hart

INVENTOR:
Wm. H. Jenkins
BY
ATTORNEYS.

UNITED STATES PATENT OFFICE.

WILLIAM H. JENKINS, OF PHILADELPHIA, PENNSYLVANIA.

IMPROVEMENT IN STEAM-TRAPS.

Specification forming part of Letters Patent No. 155,521, dated September 29, 1874; application filed September 14, 1874.

*To all whom it may concern:*

Be it known that I, WILLIAM H. JENKINS, of the city and county of Philadelphia and State of Pennsylvania, have invented a new and Improved Steam-Trap; and I do hereby declare that the following is a full, clear, and exact description of the same, reference being had to the accompanying drawing forming a part of this specification, in which—

Figure 1:
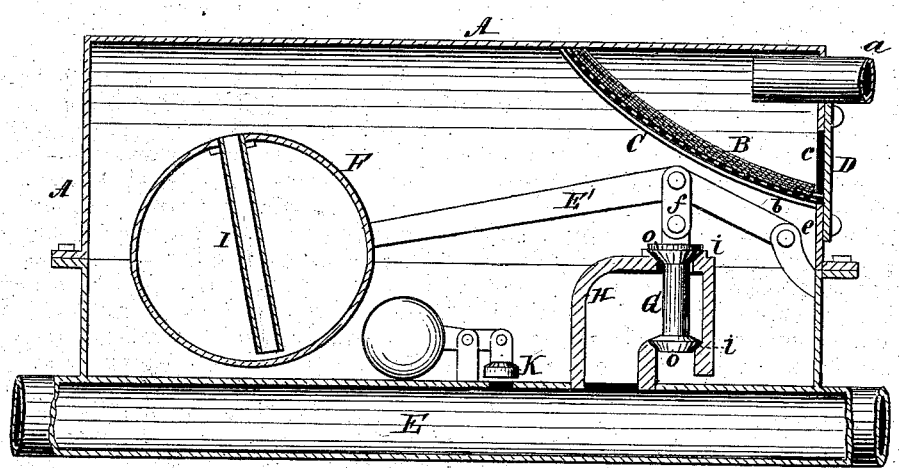
Figure 2:
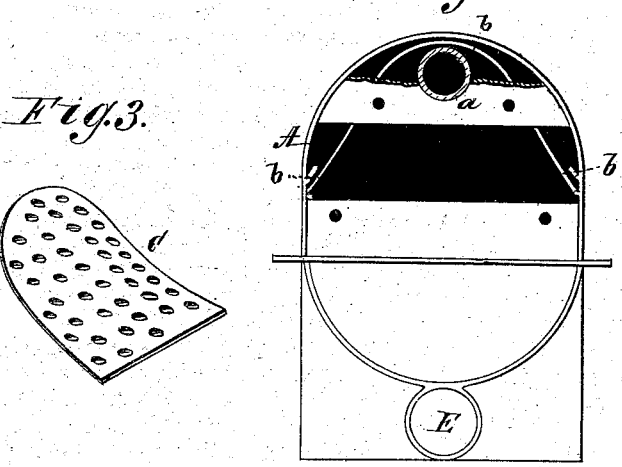
Figure 3:
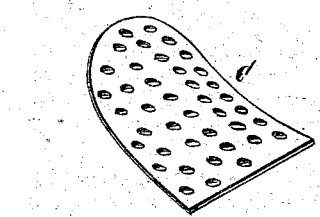

Figure 1 is a sectional elevation of my improved trap, showing the same discharged of water, the balanced valve being closed and the weighted valve open. Fig. 2 is an end view with the bonnet removed and a part of the case or box broken away to show the arrangement of filter; Fig. 3, a detail view of plate.

The object of my invention is to reduce the cost and increase the reliability and general efficiency of steam-traps of the class in which a rising and falling float is employed to operate the valve or valves that control the discharge of the water of condensation accumulated in or received from the connected steam-heating coil, pipe, or vessel. The invention consists in providing a hollow float with a tube, through which steam is admitted, and by which the water condensed therefrom escapes into the chamber of the trap. The float has no other outlet save the tube. The invention further consists in a weighted valve for discharging the water, which fills the lower portion of the trap below the line of buoyancy of the float. The invention also consists in the construction and arrangement of parts whereby the filter is supported and adapted for removal from the trap, as hereinafter described.

The trap A (see drawing) may be constructed of any approved form, size, or material; but I prefer to provide it with a cylindrical-shaped bottom to facilitate complete discharge of water therefrom, as hereinafter explained. It is provided at one end, and in the upper part thereof, with the induct-tube $a$, to which the steam-heating coil, pipe, or vessel is suitably connected. The water of condensation flows therefrom into and through the wire-gauze filter B, which is supported on a rigid perforated metal plate, C. The latter is, in turn, supported on ribs $b$ or flanges formed on the inner sides of the trap-cover, and the adjacent opening $c$ in the end of the trap being closed by a removable plate or bonnet, D, both the filter and perforated supporting-plate may be readily drawn out, when required, to free them of accumulated sedimentary or other matter. A tube, E, extends longitudinally parallel with the bottom of the trap, through which the water of condensation is discharged. Either end of this tube may be plugged and the other left open, according as the location of the trap or other convenience requires. It has been a fault in the construction of other traps that the place of such discharge has been at the same end, and there only, as the induction. The float-lever E' is pivoted or hinged to one end of the trap-box at $e$, and carries the hollow sheet-metal float F at the other or free end. The double valve G is connected to the lever by the pivoted link $f$, and seated at $i\ i$ in the hollow abutment H, through which a passage leads downward into the discharge-tube E. Both parts $o\ o$ of the valve seat downward, and both open and close simultaneously, and, being conical in form, they may be ground to their seats by means of any device suitable for turning them. It is intended the area of the portions $o$ of the valve which are exposed to the action or pressure of water, or water and steam, shall be so proportioned relatively that the valve will be self-balanced, the water finding access to the valve underneath the abutment H. The float F may be of any approved form, but is preferably globular. The float is imperforate, except at the point where the tube is screwed in or otherwise attached. A tube, I, extends from the top or upper side of the float, where it is secured, down nearly to the bottom of the same. It is open at each end, so that the steam or vapor in the trap has free access to the interior of the float. Hence an equilibrium is maintained between the steam-pressure within the float and that outside of it or within the chamber proper of the trap; but since the steam condenses inside the float perhaps more rapidly than in said trap-chamber it is evident water will often accumulate till it rises above the lower end of tube O. Whenever this occurs and the steam-pressure continues to increase the equilibrium will be maintained by a current of steam passing down the tube and up through the water. When the pressure is neither increasing nor decreasing in the trap there is no current; but when the pressure decreases some of the steam within the float must come out to restore the equilibrium. Such steam will not, however, pass back through the water in the float to reach the tube, but, by acting or pressing equally over its surface, causes, instead, the expulsion of the water through the tube till equilibrium is attained or the water no longer covers the end of the tube; in other words, the water will, in such case, pass out first and the steam last.

It will, of course, be understood that the steam-pressure in the trap always corresponds to that existing in the generator and coil or pipe connecting them. If there is any difference the pressure will be greatest in the generator; and this pressure is subject to variations from several causes not necessary to enumerate. In any case the expulsion is effected with such regularity as to leave the float practically unhindered in performance of its function. Thus I am enabled to secure all the advantages incident to the use of the ordinary hollow float without any of its disadvantages, such as liability to collapse from pressure of steam, leakage at the joint, &c.

The float has a certain line of buoyancy, below which there will ordinarily be a body of water in the trap whose discharge the float cannot effect.

When the trap is not in use it is desirable (particularly if the temperature is at or below the freezing-point) that this water should be got rid of. I accordingly provide a valve, K, which closes an outlet at the bottom of the trap into the tube E. The valve is connected to an arm or lever, which is pivoted in a standard and provided with a weight, as shown, so that the valve is overbalanced and raised from its seat whenever the steam-pressure in the trap is sufficiently reduced to be overcome by said weight, thus allowing all the water to escape. The action of the valve, like that of the float-valve, is therefore entirely automatic. It will close again whenever the steam enters the trap in sufficient volume and force.

What I claim is—

1. The combination of an open-ended tube with a hollow float, having no other outlet, substantially as shown and described, for the purpose specified.

2. The combination of the weighted valve K with the perforated bottom of the steam-trap, as shown and described.

3. The perforated plate for supporting the filter, in combination with the side ribs or flanges of the trap, the latter having an opening in its adjacent end and a removable covering-plate therefor, as shown and described.

The above specification of my invention signed by me this 7th day of September, A. D. 1874.

WM. H. JENKINS.

Witnesses:
ALEX. M. RUSSEL,
SAML. M. GRICE.